No. 623,970. Patented May 2, 1899.
B. C. BATCHELLER.
PNEUMATIC DESPATCH APPARATUS.
(Application filed Mar. 26, 1898.)
(No Model.) 8 Sheets—Sheet 1.

FIG. 1.

WITNESSES: INVENTOR:

No. 623,970. Patented May 2, 1899.
B. C. BATCHELLER.
PNEUMATIC DESPATCH APPARATUS.
(Application filed Mar. 26, 1898.)
(No Model.) 8 Sheets—Sheet 2.

FIG. 2.

WITNESSES: INVENTOR:

No. 623,970. Patented May 2, 1899.
B. C. BATCHELLER.
PNEUMATIC DESPATCH APPARATUS.
(Application filed Mar. 26, 1898.)
(No Model.) 8 Sheets—Sheet 3.

WITNESSES:
INVENTOR:
Berney C. Batcheller

No. 623,970. Patented May 2, 1899.
B. C. BATCHELLER.
PNEUMATIC DESPATCH APPARATUS.
(Application filed Mar. 26, 1898.)
(No Model.) 8 Sheets—Sheet 4.

No. 623,970. Patented May 2, 1899.
B. C. BATCHELLER.
PNEUMATIC DESPATCH APPARATUS.
(Application filed Mar. 26, 1898.)
(No Model.) 8 Sheets—Sheet 6.

WITNESSES: INVENTOR:
Berny C. Batcheller

No. 623,970. Patented May 2, 1899.
B. C. BATCHELLER.
PNEUMATIC DESPATCH APPARATUS.
(Application filed Mar. 26, 1898.)

(No Model.) 8 Sheets—Sheet 7.

Witnesses. Inventor.
Birney C. Batcheller
by
Francis T. Chambers
his Attorney.

United States Patent Office.

BIRNEY C. BATCHELLER, OF PHILADELPHIA, PENNSYLVANIA.

PNEUMATIC-DESPATCH APPARATUS.

SPECIFICATION forming part of Letters Patent No. 623,970, dated May 2, 1899.

Application filed March 26, 1898. Serial No. 675,266. (No model.)

*To all whom it may concern:*

Be it known that I, BIRNEY C. BATCHELLER, a citizen of the United States of America, residing in the city and county of Philadelphia, in the State of Pennsylvania, have invented a new and useful Improvement in Pneumatic-Despatch Apparatus, of which the following is a true and exact description, reference being had to the accompanying drawings, which form a part thereof.

My invention relates to pneumatic-despatch apparatus, and particularly to that portion of such apparatus which has for its function the introducing of a carrier into a transit-tube either at a terminal or intermediate station of the line, my object being primarily to provide a sending apparatus—that is to say, a device by means of which a carrier is fed to the tube—with an actuating device by which a single motion operates the sending apparatus and provides for its return to its non-active position automatically after and only after the carrier has left the sending apparatus.

In its preferred form my invention consists in the combination of a sending apparatus or device, an actuating-lever to operate the same, a latch to hold the lever in operative position, and latch-releasing mechanism arranged to be actuated by the exit of a carrier from the sending apparatus.

My invention further consists in various details of construction and combinations of mechanism, which will be best understood as described in connection with the drawings in which my invention is illustrated, and in which—

Figs. 17 and 18, details of the mechanism shown in Fig. 16, and Figs. 19 and 20 side and front elevations of a very simple embodiment of the broader idea of my invention.

A indicates a transit-tube which in the construction illustrated is interrupted, space being left between its two ends for the movable sectional tubes $D^2$ and $D^3$, supported on the swinging arms D D, which arms are pivoted on the rod or shaft $C'$, supported on the standards C C. The normal position of the parts is that shown in Figs. 2 and 6, in which the main-tube section $D^3$ registers with the interrupted ends of the main tube, forming in effect a part of the normal tubular system, and in which the other sectional tube $D^2$ lies in position, as shown, to receive a carrier which it is desired to insert in the transit-tube. The portions $D'$ of the swinging frame lying between the sectional tubes and flush with the interrupted ends of the main tube are flat and fit against the interrupted ends of the main tubes, so as to close them when this web portion is opposite to them, and the portions $C^2$, extending out from the standards C, are flat and fit nicely against the ends of the tube section $D^3$ when it is moved out of registry with the main tube.

B is a by-pass connecting the interrupted sections of the main tube A around the sending apparatus and giving free passage to air at all times, so that the motion of carriers in the system will not be interrupted by the temporary interruption of the conduit A, caused by the action of the sending apparatus.

Figures 6, 7, 8, 9, 10, 11:
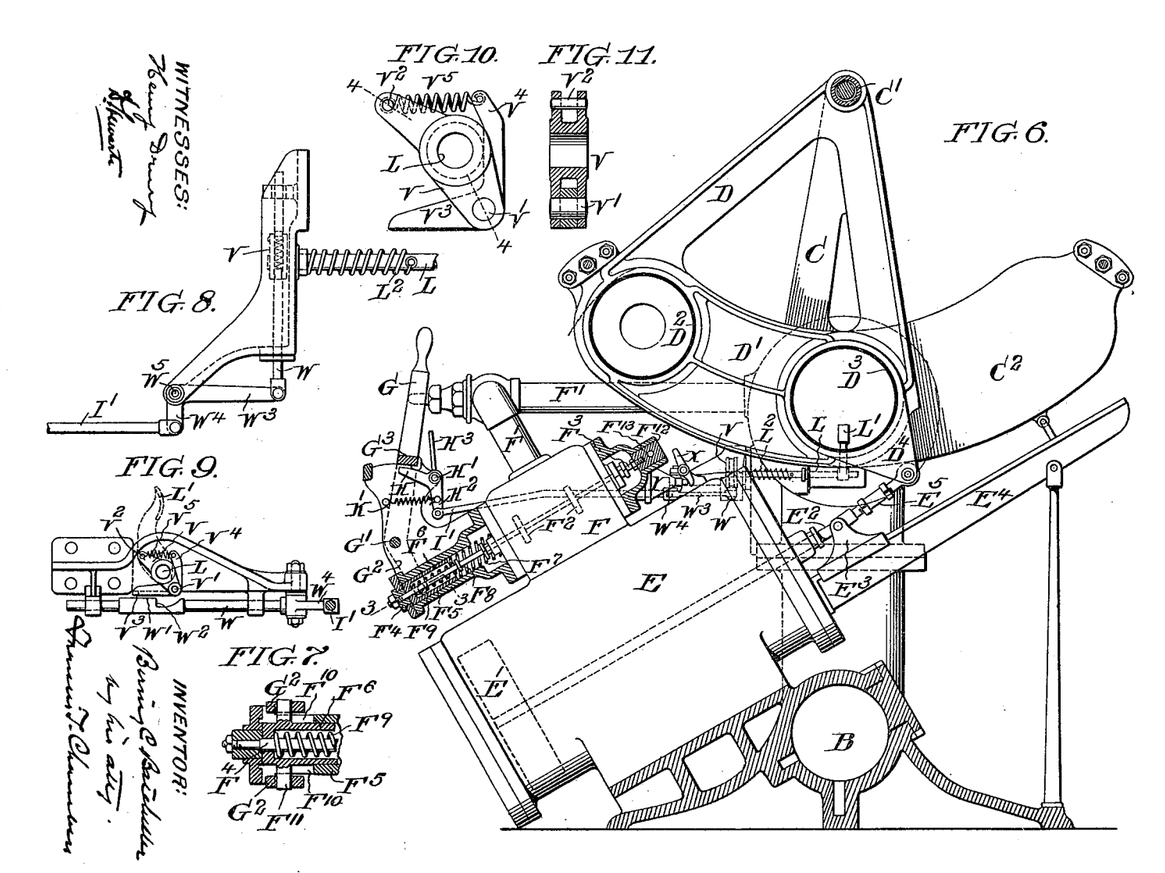
Fig. 6 is a view similar to that shown in Fig. 2, but illustrating a modification of my device.
Fig. 7 is a cross-sectional view taken as on the line 3 3 of Fig. 6, showing a detail of construction.
Fig. 8 is a plan view of a portion of the lever-lock-releasing mechanism constructed in accordance with the modification of Fig. 6.
Fig. 9 is an end view of this mechanism.
Fig. 10, an enlarged view of a portion thereof.
Fig. 11, a cross-sectional view taken as on the line 4 4 of Fig. 10.
Figure 12:
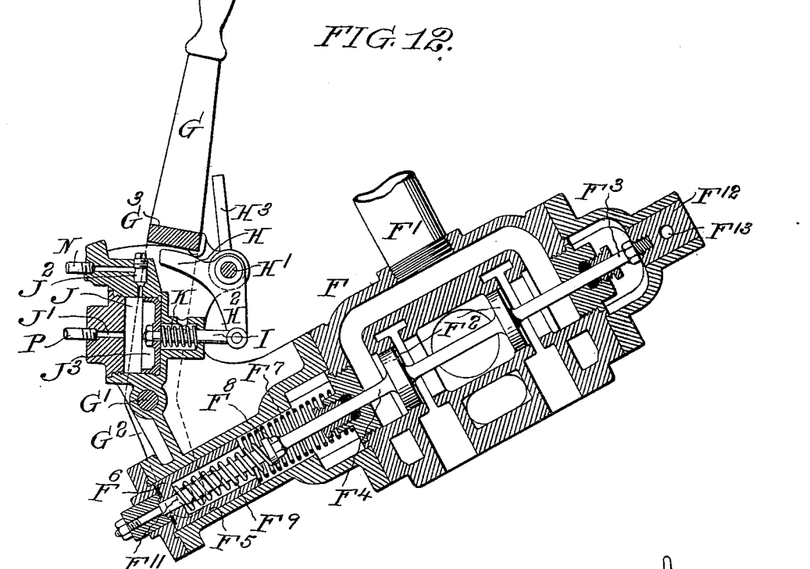
Fig. 12 is an enlarged sectional view of the portion of the lever-lock-actuating mechanism and also of the valve and its connections, upon which in the construction shown in the drawings the actuating-lever directly operates.
Figure 19:
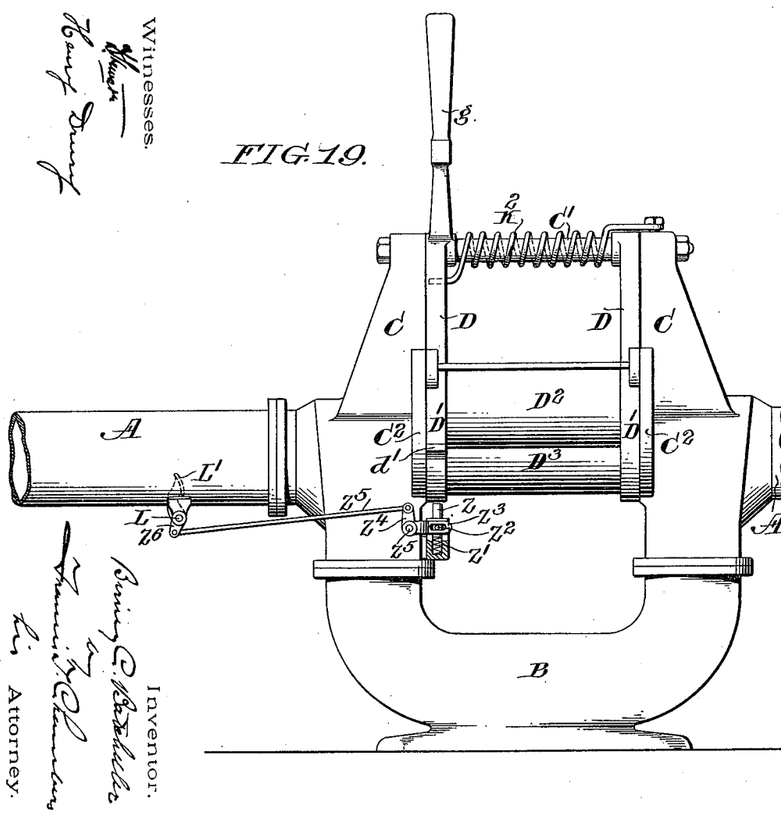
Figure 20:
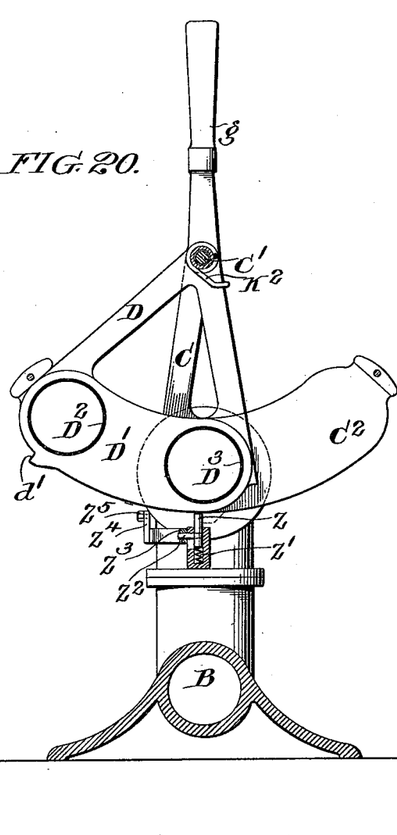

As shown, the swinging frame D, except in Figs. 19 and 20, is actuated by means of a piston $E'$ in a cylinder E, the piston-rod $E^2$ being connected to a cross-head $E^3$, sliding in a guide $E^4$, and through a connecting-rod $E^5$ with an arm $D^4$ secured, as shown, to the tube $D^3$. The admission and exhaust of motive fluid, preferably compressed air, which may be drawn directly from the transit-tube, are governed, except in Fig. 16, by the movements of a piston-valve $F^2$ in a casing F, (shown in section in Fig. 12,) the motive fluid coming from a supply-pipe $F'$, and the valve-rod extending in one direction, as indicated at $F^3$, to an attached head $F^{12}$, having, as shown, a perforation $F^{13}$ formed in it, through which and the guideway in which the head moves a locking-bolt can be inserted at will to prevent motion of the stem and valve. In the other direction the valve-stem extends, as indicated at $F^4$, through a cylindrical box $F^5$, in which, as shown, is situated a hollow cylindrical plunger $F^6$, having, as best seen in Fig. 7, pin or trunnion like extensions $F^{11}$, extending outward through slots $F^{10}$ in the box $F^5$. A spring $F^7$ is arranged to hold the plunger $F^6$ normally at the end of the box, as shown in Fig. 12, and another spring $F^9$ extends from the hollow of the plunger $F^6$ to a ring preferably adjustably secured on the valve-stem, as indicated at $F^8$.

To the pins or trunnions $F^{11}$ are connected the forked arms $G^2 G^2$ of the sending-lever G, which is pivoted at $G'$, as shown, and which when moved toward the left forces the plunger $F^6$ forward or inward in the box $F^5$, compressing the springs $F^7$ and $F^9$ and through the latter spring pushing the valve-rod toward the right and shifting the position of the valve to that in which it will effect a movement of the piston $E'$ and of the sending apparatus if the valve is at the time free to move, a condition which in the particular arrangement shown in the drawings may not exist either by reason of a locking-pin being inserted through the hole $F^{13}$ or by reason of the locking-lug X (see Fig. 6) being by the action of the device indicated at Y forced over, so as to rest against the sliding block $F^{12}$.

In the features above described the apparatus shown in my drawings is substantially like that shown in my prior patents, dated December 21, 1897, and numbered 595,754 and 595,756, in which patents the locking device indicated at X and Y in Fig. 6 of my drawings is fully shown and described. In illustrating this part of the mechanism I do not wish to be understood as in any way limiting my invention upon its employment, because while its mechanism is well adapted for the purpose my invention, as will be obvious, is adapted for use with any sending mechanism.

As shown in my prior patents above referred to, the actuating-lever of the sending apparatus is provided with a locking-segment, by which it can be secured either in operative or non-operative position; but the locking mechanism is of such a kind as to require manipulation by the operator to change the position of the lever, and, as briefly stated above, it is an object of my present invention in its best form to make the return of the sending-lever to non-operative position automatic, relieving the operator of all further care after he has latched the lever in its sending position, in which position it will remain through whatever period is required for the release of the locking device provided to prevent motion in the sending apparatus and through whatever time also may be required for the sending apparatus to move to its designed position to bring the new carrier into line with the transit-tube and until the carrier has actually escaped from the sending apparatus into the transit-tube.

Figure 1:
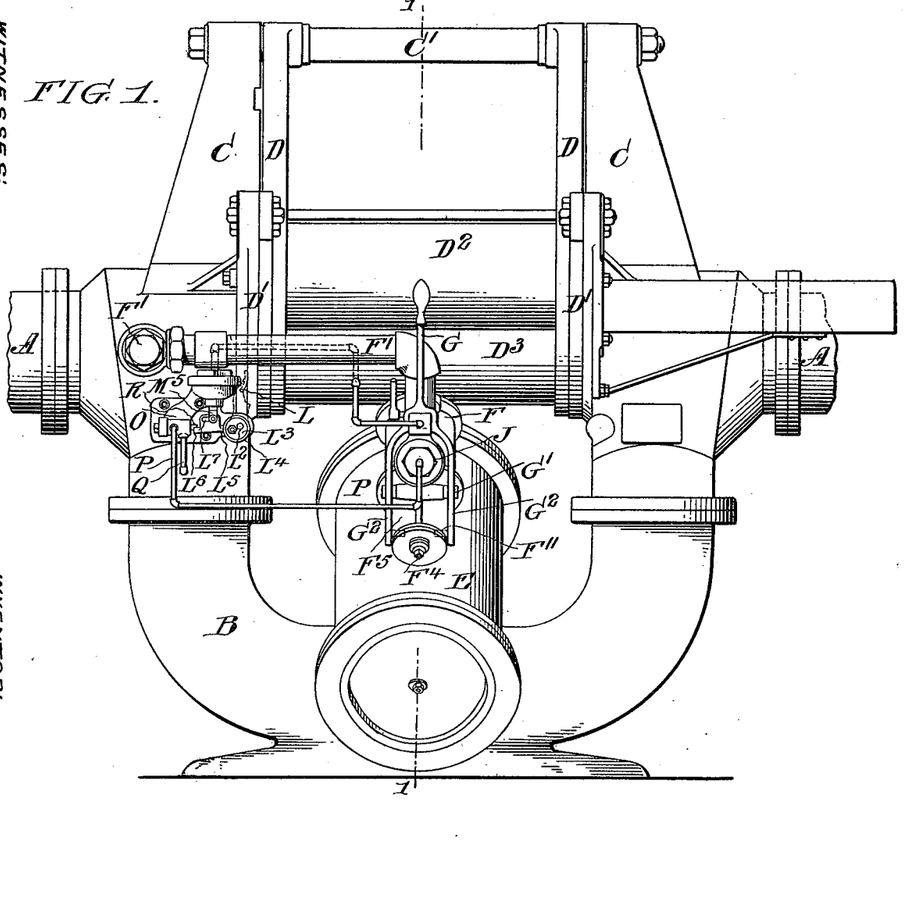
Figure 1 is a side view of a sending apparatus adapted for use at an intermediate station on the main transit-tube and provided with my improvements.
Figure 2:
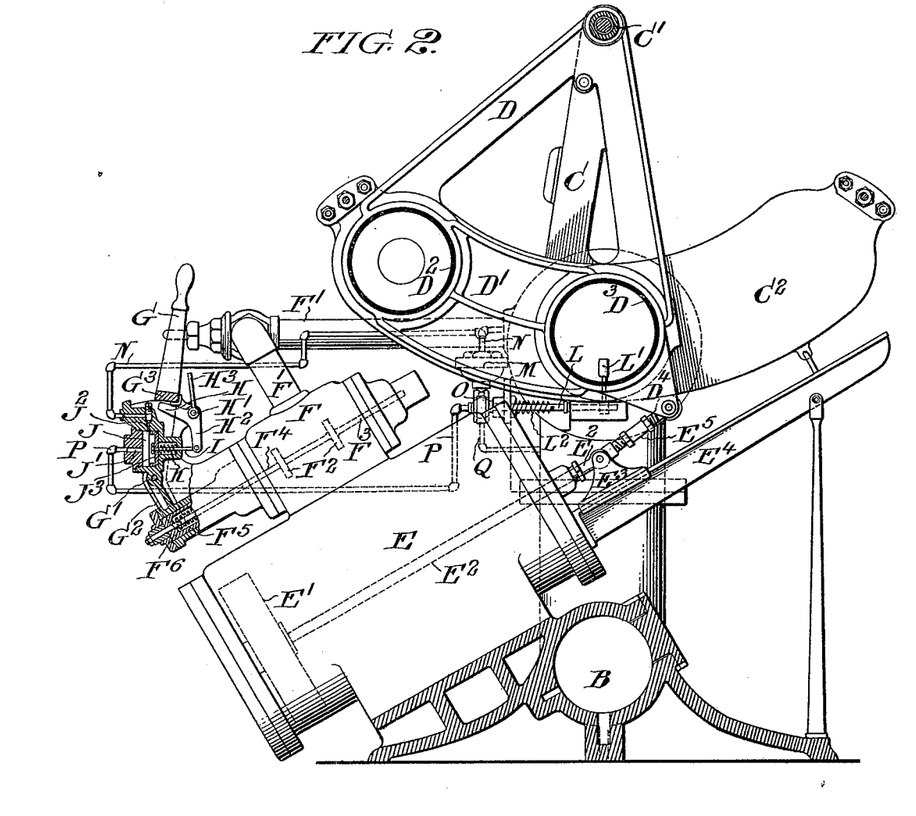
Fig. 2 is a front view of the sending apparatus with the improved parts shown as on the section-line 1 1 of Fig. 1.

My preferred form of mechanism for acting upon the lever to latch and unlatch it is that shown in Figs. 1 to 5, inclusive, in which $H H^2$ is the locking-lever, pivoted at $H'$, the end H being arranged when thrust up to rest against the cross-bar $G^3$ of the sending-lever and latch it in operative position, while to the end $H^2$ is connected a spring which normally acts to press the arm H into position to engage the lever, as shown in Fig. 2. A rod I is directly connected to the end of the arm $H^2$ and to a piston $J^3$, working in a cylinder J, having a port $J'$ leading into its end and another port $J^2$ leading through its side in position to be uncovered by the piston when it moves to the right and covered and closed by it when it moves to the left. The spring acting upon the lever-lock is indicated at K, its normal action being not only to press the active end of the lock-lever upward, but also to press the piston $J^3$ toward the left, and thus to close the port $J^2$. The arm $H^3$ (indicated in the drawings) is simply a handle attached to the lever $H H^2$ and by which it can be manually operated. From the port $J'$ of the cylinder J leads a pipe P, which connects with the chamber $O^2$ of the valve-casing O, (see Figs. 3 and 4,) while a supply-pipe Q, leading from the transit-tube, connects with the chamber $O'$ in the said casing. From the other port $J^2$ of the cylinder J leads the pipe or conduit N, which connects, as shown, with the top of the cylinder M.

Figure 3:
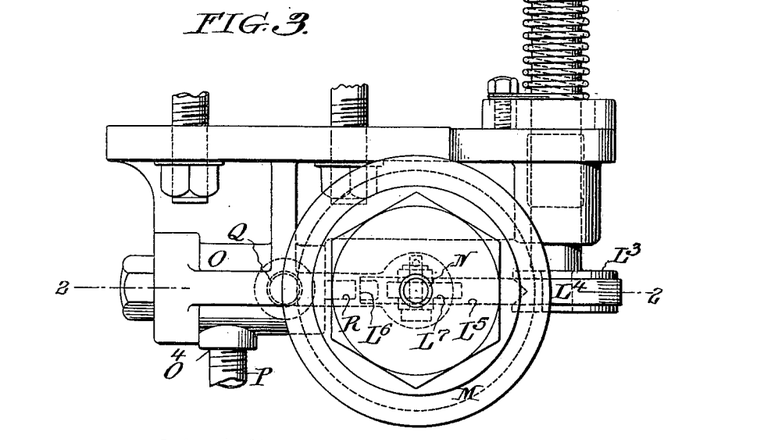
Fig. 3 is a plan view of a portion of the lever-lock-releasing mechanism.
Figure 4:
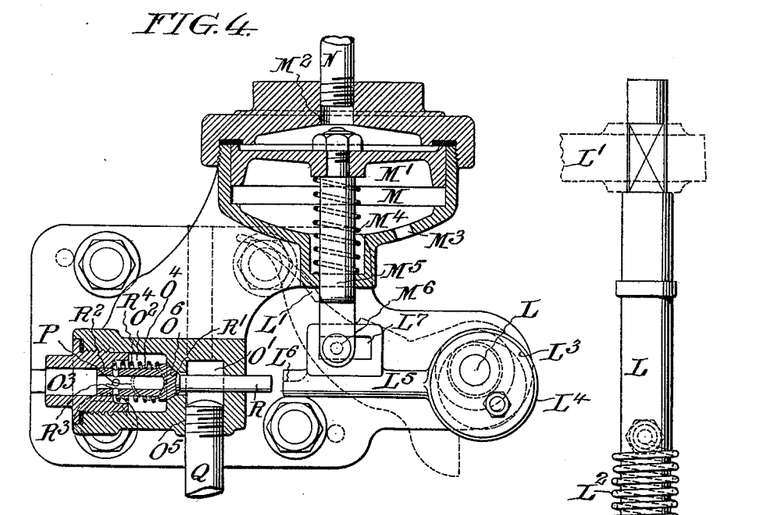
Fig. 4 is an end view of this mechanism, partly shown as on the section-line 2 2 of Fig. 3.
Figure 5:
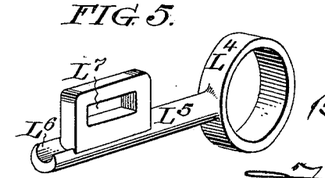
Fig. 5 is a perspective view of a detail of the mechanism.

Referring now particularly to Figs. 3, 4, and 5, it will be seen that the ports $O'$ and $O^2$ of the valve-casing O connect with each other through the port $O^6$, and also that a cylindrical passage $O^3$ leads out of the chamber $O^2$, as best shown in Fig. 4.

R is a valve-stem extending through the chamber $O'$ to the outside of the casing O, as shown, and connected at its inner end with a valve $R'$, having a tubular extension $R^2$, which extends from the valve $R'$ through the chamber $R^2$ and fits in the cylindrical passage $O^3$. Ports $R^3$ are formed through this tubular portion of the valve in position, as shown, to open into the chamber $O^2$ when the valve $R'$ is seated, thus connecting said chamber with the passage $O^3$, while the lifting of the valve $R'$ from its seat forces said openings $R^3$ back into the cylinder $O^3$, thus cutting off communication between said cylindrical opening and the chamber $O^2$.

$R^4$ is a spring acting to normally hold the valve $R'$ seated, as shown in Fig. 4.

L is a rock-shaft, to which is attached a finger $L'$, which by the action of a spring $L^2$, as shown, coiled round the shaft L, is normally held so as to project up into one of the tube-sections A, as indicated in Figs. 1, 2, and 6, the passage of a carrier pressing such finger down and causing a corresponding motion in the shaft L, while after the passage of the carrier the parts are returned to normal position by the action of the spring $L^2$.

$L^3$ (see Figs. 3 and 4) is an eccentric attached to the shaft L and to which, by means of the eccentric-strap $L^4$, is connected the valve-actuating rod $L^5 L^6$, the operative end $L^6$ of which is grooved out, as shown, so that under certain conditions it will pass below the end of the rod R, which rod will lie in the groove.

$L^7$ is a slotted extension on the top of the valve-actuating rod and by means of which and the pin $M^6$ it is attached to and supported by the piston-rod $M^5$ of a piston $M'$, moving in the cylinder M, $M^4$ being a spring which normally holds the piston and its rod in their uppermost position, as shown in Fig. 4, in which position the end of the rod $L^5 L^6$ lies opposite to the valve-rod R and in position to actuate such valve-rod.

$M^3$, Fig. 4, indicates an opening through the lower part of the cylinder M, through which air can freely escape.

The operation of the mechanism is readily followed. A carrier being inserted in the sectional tube $D^2$, the operator takes hold of the sending-lever G and moves it outward until it is engaged by the operative end H of the lever H $H^2$. This motion of the lever permits the spring K not only to effect the latching of the lever, but to force the piston $J^3$ to a corresponding position—that is to say, as shown, for instance, in Fig. 2, to the left-hand end of the cylinder J—and having moved it the operator need concern himself no more about the mechanism, and immediately after any locking devices in the system have been released the motion of the sending-lever effects the desired shifting of the sending apparatus, bringing the tube-section $D^2$ into registry with the transit-tube, after which of course the pressure of air forces the carrier out of the sectional tube and into the transit-tube, in which motion it pushes the finger $L'$ down to the position indicated in dotted lines in Fig. 4, and this motion of the finger, acting through the shaft L and eccentric $L^3$, draws the valve-actuating rod $L^5 L^6$ backward, so that its end $L^6$ will clear the end of the valve-actuating rod R, as is shown in Figs. 3 and 4, and at the same time the spring $M^4$, acting on the piston $M'$ and piston-rod $M^5$, draws the operative end $L^6$ of the actuating-rod upward, so that it lies opposite to the end of the piston-rod R. As soon as the carrier has passed over the finger $L'$ the spring $L^2$ causes it and its attached mechanism to return to normal position, and the consequent motion of the eccentric $L^3$ forces the actuating-rod $L^5 L^6$ outward until the end $L^6$ impinges against the end of the rod R, lifting the valve $R'$ from its seat and causing the tubular portion $R^2$ of the valve to move into the cylindrical passage $O^3$ to a distance sufficient to close the ports $R^3$. The motive fluid (compressed air) will then pass from the supply-pipe Q through the chamber $O'$ and passage $O^6$ into the chamber $O^2$, thence through the opening $O^4$ in said chamber into the conduit P, from which (see Fig. 2) it passes into the end of the cylinder J and, acting against the piston $J^3$, forces said piston to the position shown in Fig. 2, depressing the lever-lock and releasing the actuating-lever G, which immediately returns to the position in which it lies above the lock-lever. The described motion of the piston $J^3$ opens the port $J^2$ in the cylinder J, through which and the connected conduit N the compressed air passes into the head of the cylinder M, as shown, through the opening $M^2$. The air-pressure acting against the piston $M'$ forces it down in the cylinder M, and the piston-rod $M^5$ therefore forces the end $L^6$ of the connecting-rod $L^5 L^6$ down until it ceases to abut against the end of the rod R, whereupon the spring $R^4$ causes the return of the valve $R' R^2$ to the position shown in Fig. 4, the end of the valve-rod R moving backward through the recessed portion of the end $L^6$. This receding of the valve not only cuts off the supply of compressed air to the cylinder J, but opens the conduit P to the atmosphere through the valve-chamber $O^2$, the ports $R^3$, the hollow valve $R^2$, and the passage $O^3$, so that the pressure in the cylinder J and ports connected therewith rapidly falls to atmospheric pressure, and the apparatus is in condition to again engage the sending-lever G when it is moved to an operative position.

Figure 13:
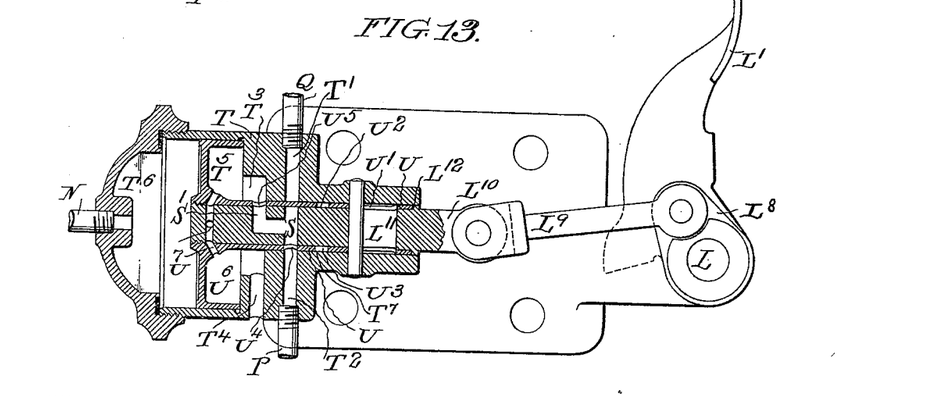
Figs. 13, 14, and 15 are sectional views of a third modification in the lever-lock-actuating mechanism, the three views exhibiting the mechanism in three different positions which it assumes in the act of operation.
Figure 14:
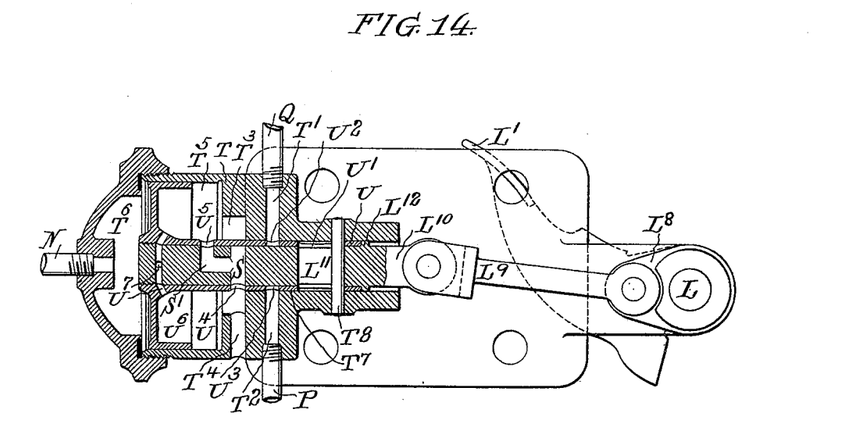
Figure 15:
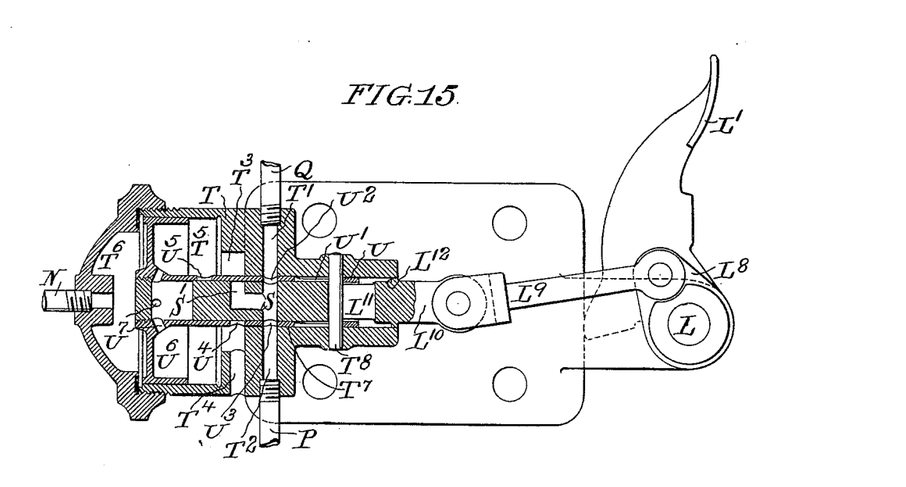

In Figs. 13, 14, and 15 I have illustrated a modification of the valve mechanism for admitting and exhausting compressed air to the cylinder J. The valve-casing in this construction is indicated at T and has formed in it a port $T'$, which connects with the conduit Q, and a port $T^2$, which connects with the conduit P, both of said ports connecting also with a cylindrical passage in the casing and preferably lying directly opposite to each other, as shown. The cylindrical passage referred to, and indicated at $T^7$, is enlarged into an annular space $T^3$, which connects with the atmosphere through a port $T^4$, and a further enlargement is indicated at $T^5$, where the casing is formed into a cylinder, the outer head of which forms a chamber $T^6$, with which connects the pipe N, as shown. $T^8$ is a pin extending through the tubular bore $T^7$, for purposes to be hereinafter described. U is a tube-section fitting in the tubular bore $T^7$ of the casing T and having slots $U'$, through which the pin $T^8$ passes. In the tube are formed the ports $U^2$ and $U^3$, which in one position—that indicated in Fig. 15—register with the ports $T'$ and $T^2$. Other ports $U^4$ and $U^5$ are formed through the tube, as shown, while at its extreme end additional ports, as indicated at $U^7$, are provided at or near the point where the end of the tube connects with the piston (indicated at $U^6$) and moving the cylinder $T^5$. In this modification of my apparatus the finger $L'$ and the rock-shaft, to which it is attached, are constructed as already described; but in place of the eccentric $L^3$, I here employ a lever-arm $L^8$, which is of course the mere equivalent of the eccentric and which, by means of a connecting-rod $L^9$, is attached to a plunger $L^{10}$, which fits in the tube U and is provided, as shown, with a slot $L^{11}$, through which the pin $T^8$ passes. The plunger is formed with a port S, leading through it and adapted in the position shown in Figs. 13 and 15 to come opposite to the ports $T'$ and $T^2$, and with this port or passage S is connected the port or passage $S'$, coming opposite to the enlargement $T^3$ in the valve-chamber. The normal position of the parts is that shown in Fig. 13, in which, it will be observed, the supply-pipe Q is cut off from connection with the valve-casing by the position of the tube U, while the pipe P is in free communication with the atmosphere through the port $T^2$, the port $U^4$, the passages S and $S'$, the port $U^5$, the enlarged passage $T^3$, and the exhaust-port $T^4$. The depression of the finger $L'$ by the outgoing carrier thrusts the plunger $L^{10}$ inward, as shown in Fig. 14, the shoulders $L^{12}$ pressing against the end of the tube U and pressing it also inward until its ports $U^2$ and $U^3$ register with the ports $T'$ and $T^2$, while its port $U^4$ comes opposite to the space $T^3$, and the piston $U^6$, attached to the end of the tube, is moved over to the left-hand end of the cylinder $T^5$. The return of the finger $L'$ to its normal position by the action of the spring on the rock-shaft draws back the plunger $L^{10}$ to the position indicated in Fig. 15, but leaves the tube U and its piston $U^6$ in the position to which they were removed, as described in connection with Fig. 14. The compressed air then passes freely from the pipe Q through the ports $T'$, $U^2$, S, $U^3$, and $T^2$ to the pipe P, and thence into the cylinder J, where it operates to move the piston $J^3$, as already described, and after the piston has been moved permits the compressed air to flow through the pipe N into the chamber $T^6$, where, acting against the piston $U^6$, it forces said piston and the tube U, to which it is connected, into the position indicated in Fig. 13, cutting off the supply of compressed air and opening the pipe P to the atmosphere, as already described.

Referring next to the modification illustrated in Figs. 6 to 11, inclusive, I would premise my description by saying that this modification differs from the forms already described in dispensing entirely with pneumatic means for actuating the lever-lock, substituting purely mechanical devices for this purpose, and while in a broad sense this mechanical device is an equivalent to and a mere modification of my invention, as shown in the forms already described, it also embodies features of construction invented by me, which as they are alternative to the pneumatic system specifically claimed in this application will therefore form the subject-matter of another application for Letters Patent filed by me March 26, 1898, Serial No. 675,267.

Referring again to the drawings, it will be seen that no cylinder J is connected with the lever-lock H $H^2$, but that a spring (indicated at $K'$) is employed, having the same action on the lever-lock as the spring K, (shown in connection with the cylinder J.) From the end of the arm $H^2$ of the lever-lock extends, in place of the piston-rod I of the other construction, a rod $I'$, which connects with the short arm $W^4$ of the bell-crank lever, the other end of which is indicated at $W^3$ and which is pivoted at $W^5$, and to the arm $W^3$ of this lever is connected the rod W, moving in suitable guides and having attached to it the block $W'$, in which is formed the notch $W^2$. The lock-shaft L, which, together with the attached finger $L'$, is similar to that described with respect to my former constructions, extends at right angles to the rod W, and has attached to its end the head V, which lies immediately above the notched block $W'$ and is formed to provide a pivot-pin $V'$ at one extremity and a pin $V^2$ at its other extremity. $V^3 V^4$ is a bell-crank lever pivoted on the pin $V'$ and connected, as by a spring $V^5$, with pin $V^2$, the action of the spring being to draw the arm $V^4$ against the center of the head V, as shown in Fig. 10, holding the arm $V^3$, in normal position of the parts, in the position indicated in Figs. 10 and 9—that is, lying above and parallel with the upper surface of the block $W'$. When the finger is depressed and the rock-shaft correspondingly moved, the head V, moving with the rock-shaft and carrying the bell-crank lever $V^3 V^4$ with it, presses the arm $V^3$ down upon the horizontal surface of the block $W'$ and at the same time moves it toward the right, as shown in Fig. 9, until its end comes opposite to the notch $W^2$, into which the action of the spring $V^5$ forces it. The release of the finger by the passage of the carrier causes it and the rock-shaft to resume their normal position, the spring $L^2$ acting therefore to turn the arm $V^3$ to the left, as shown in Fig. 9, and thereby forcing the rod W in this direction, actuating the bell-crank lever $W^3 W^4$ and the rod $I'$ and through this rod the lever-lock H $H^2$, the end H of which is depressed so as to release the sending-lever G. The further movement of the rock-shaft, lifting the end of the lever-arm $V^3$ out of the notch $W^2$, enables the spring $K'$ to actuate the lever-lock to engage the lever when it is next moved to an operative position.

Figure 16:
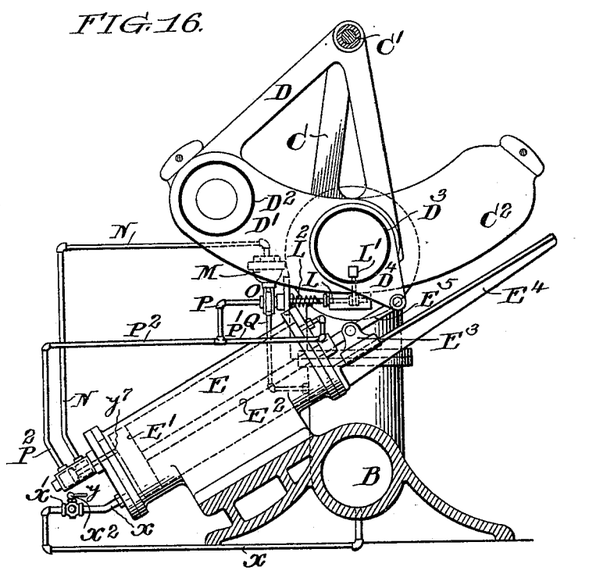
Fig. 16 is an elevation showing a modified form of my invention.
Figure 17:
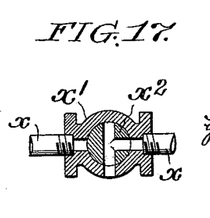
Figure 18:
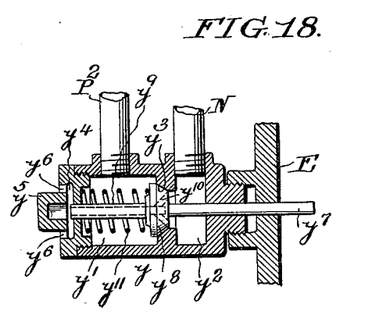

In the various modifications of my invention hereinbefore described the sending-lever, having a yielding connection with the controlling-valve of the actuating-cylinder, has formed an element, and for obvious reasons I prefer and recommend its use. My invention, however, in this broader sense, does not necessarily involve the presence of this lever or, indeed, of an actuating-cylinder, and in Figs. 16 to 20 I have illustrated further modifications of my invention, the one illustrated in Figs. 16 to 18 showing a construction in which the sending-lever is dispensed with, but an actuating-cylinder still employed, while the one illustrated in Figs. 19 and 20 illustrates a construction in which the operator acts directly upon the sending apparatus without the intervention of an actuating-cylinder.

Referring first to the construction shown in Figs. 16 to 18, it will be seen that the sending apparatus, the valves O and M, the connections to and from these valves, and the mechanism directly connected therewith are the same in all essential particulars as shown and described in connection with my preferred and most perfect form of apparatus. In place, however, of using the governing or controlling valve F, I lead a connection (indicated at $x$) from a source of fluid-pressure, as shown, from the pneumatic tube to the rear end of the cylinder E and place in this connection a valve-casing $x'$ and three-way cock $x^2$, by means of which the end of the cylinder E can be placed in connection with a source of fluid-pressure or connected to the atmosphere to exhaust, as indicated in the sectional view Fig. 17. The pipe P, leading from the valve-chamber O, branches, as indicated at $P'$ $P^2$, the branch $P'$ entering the head of the cylinder E and the branch $P^2$ entering the chamber $y'$. In a casing $y$, having formed in it a second valve-chamber $y^2$, connected with the first by the passage $y^3$, which passage is adapted also, as shown, to serve as a valve-seat in the head of the chamber $y'$, is formed another chamber $y^4$, connecting freely with the atmosphere through passages $y^6$ and also with a short cylindrical chamber $y^5$. $y^7$ is a valve-stem extending through the lower head of the cylinder E and secured to a valve $y^8$, adapted to seat itself, as shown, in the passage $y^3$, the valve-stem being continued in tubular form through the chamber $y'$ and into the chamber $y^4$, the tubular stem being connected through passages $y^{10}$ with that face of the valve which is open to the chamber $y^2$, and the tubular portion $y^9$ of the valve-stem being of a diameter which fits neatly in the cylindrical chamber $y^5$. A spring $y^{11}$ acts to hold the valve $y^8$ closed when conduit N, leading from the top of the casing M, connects, as shown, with the chamber $y^2$.

The valve-casing $y$, with its connected parts and connection with the cylinder, is not specifically claimed in this application, because it forms in part the subject-matter of my former application, filed February 24, 1898, Serial No. 671,413.

The operation of the above-described construction is as follows: The normal position of the parts is that indicated in Fig. 16, and when a carrier has been inserted in the sending-tube $D^2$ the operator turns the cock $x^2$, admitting air through the pipe $x$ into the lower head of the cylinder E and forcing the piston $E'$ forward until the sending-tube $D^2$ registers with the transmission-tube. After admitting sufficient compressed air into the cylinder to perform this work the operator returns the cock $x^2$ to its normal position, that shown in Fig. 17, which permits the air to exhaust freely from the cylinder E. The operation of the carrier on leaving the sending-tube is, as before described, to depress the finger $L'$, and through precisely the combinations of mechanism already described to connect the supply-pipe Q with the pipe P, admitting the compressed air through the pipe $P'$ into the upper head of the cylinder E and forcing the piston $E'$ back to the position shown in Fig. 16. The compressed air is of course also admitted into the chamber $y'$ through the branch pipe $P^2$, but as that chamber is closed by the valve $y^8$ no effect is produced by the initial admission of pressure fluid to the chamber. As the piston $E'$ approaches the lower end of the cylinder it strikes against the projecting end of the valve-stem $y^7$, pressing the valve $y^8$ into the chamber $y'$ and opening the passage $y^3$, and at the same time the end of the hollow stem $y^9$ enters the cylindrical chamber $y^5$, which prevents any escape of the motive fluid into the chamber $y^4$. The valve being opened the pressure fluid flows from the branch pipe $P^2$ through the chambers $y'$ and $y^2$ into the pipe N and thence into the head of the cylindrical casing M, acting on the piston $M'$ as already described, and through its action closing the valve in the casing O. As soon as the piston $E'$ moves away from the lower end of the cylinder E the spring $y^{11}$ returns the valve $y^8$ to its seat, bringing the parts to the position shown in Fig. 18, whereupon any pressure fluid remaining in the casing M and pipe N will escape freely through the chamber $y^2$, the ports $y^{10}$, the hollow valve-stem $y^9$, the chamber $y^4$, and the open passages $y^6$.

The construction shown in Figs. 19 and 20 presents my invention in perhaps its simplest form. The sending apparatus in this construction is operated by a lever $g$, connected securely to the frame D, and a latch or bolt $z$ is provided in position to engage a detent $d'$ and hold the sending-frame in position when the sending-tube $D^2$ registers with the transmission-tube. $z'$ indicates a spring which operates to thrust the bolt or latch $z$ upward. The bolt is provided with a pin $z^2$, which extends into a slot in a bell-crank lever-arm $z^3$, the other arm of which lever is indicated at $z^4$ and the pivotal connection of which is indicated at $z^5$. The depression of the bolt is effected by connecting the arm $z^4$ of the bell-crank lever with the finger L', as indicated in Fig. 19, where a lever $Z^6$, connected to the rock-shaft L, is connected in turn by a rod $Z^5$ with the bell-crank lever aforesaid and so that on the escape of a carrier from the sending-tube the depression of the finger L' effects directly the depression of the bolt or latch $z$, releasing the detent $d'$, whereupon a spring—such, for instance, as $K^2$—restores the sending apparatus to normal position.

Having now described my invention, what I claim as new, and desire to secure by Letters Patent, is—

1. In a pneumatic-despatch-tube system the combination with a transit-tube of a sending apparatus whereby a carrier can be injected into the tube, a lever arranged to actuate said sending apparatus, a lock arranged to hold said lever in position to act on the sending apparatus and means for releasing the lever from the lock situated in the transit-tube close to the sending apparatus and actuated by the escape of a carrier from the sending mechanism.

2. In a pneumatic-despatch-tube system the combination with a transit-tube of a sending apparatus whereby a carrier can be injected into the tube, a lever arranged to actuate the sending apparatus, a resilient connection arranged between said lever and the sending apparatus, a lever-lock arranged to engage and hold the lever aforesaid in position to actuate the sending apparatus, and means for releasing the lever from the lever-lock actuated by the escape of a carrier from the sending apparatus.

3. In a pneumatic-despatch-tube system the combination with a transit-tube of a sending apparatus whereby a carrier can be injected into the tube, a lever arranged to actuate the sending apparatus, a resilient connection arranged between said lever and the sending apparatus, a lock or locks arranged to prevent the movement of the sending apparatus under certain conditions, a lever-lock arranged to engage and hold the lever aforesaid in position to actuate the sending apparatus and means for releasing the lever from the lever-lock actuated by the escape of a carrier from the sending apparatus.

4. In a pneumatic-despatch-tube system the combination with a transit-tube of a sending apparatus whereby a carrier can be injected into the tube, a lever arranged to actuate the sending apparatus, a resilient connection arranged between said lever and the sending apparatus, a lock or locks arranged to prevent the movement of the sending apparatus under certain conditions, a lever-lock arranged to engage and hold the lever aforesaid in position to actuate the sending apparatus, a finger arranged in the tube at the outlet of the sending apparatus, resilient means for holding said finger normally in position to be engaged by a carrier and return it to such position after being depressed, and means actuated by the return of said finger arranged to withdraw the lever-lock.

5. In a pneumatic-despatch-tube system the combination with a transit-tube of a sending apparatus whereby a carrier can be injected into the tube, a lever arranged to actuate the sending apparatus, a resilient connection arranged between said lever and the sending apparatus, a lever-lock arranged to engage and hold the lever aforesaid in position to actuate the sending apparatus, means, as a spring acting to normally press the lever-lock into position to engage the lever, a pneumatic cylinder and piston arranged to disengage the lever-lock from the lever, a conduit for motive fluid leading from a source of supply to said cylinder, a valve or valves in said conduit arranged to regulate the passage of fluid therethrough and means arranged to be actuated by the exit of a carrier from the sending apparatus for operating said valve or valves.

6. In a pneumatic-despatch-tube system the combination with a transit-tube of a sending apparatus whereby a carrier can be injected into the tube, a lever arranged to actuate the sending apparatus, a resilient connection arranged between said lever and the sending apparatus, a lock or locks arranged to prevent the movement of the sending apparatus under certain conditions, a lever-lock arranged to engage and hold the lever aforesaid in position to actuate the sending apparatus, means, as a spring, acting to normally press the lever-lock into position to engage the lever, a pneumatic cylinder and piston arranged to disengage the lever-lock from the lever, a conduit for motive fluid leading from a source of supply to said cylinder, a valve or valves in said conduit arranged to regulate the passage of fluid therethrough and means arranged to be actuated by the exit of a carrier from the sending apparatus for operating said valve or valves.

7. In a pneumatic-despatch-tube system the combination with a transit-tube of a sending apparatus whereby a carrier can be injected into the transit-tube, a motor for actuating said sending apparatus, a power-controlling device for regulating the operation of said motor, an actuating-lever having a resilient connection with said controlling device and a lock to secure it in position to actuate said controlling device, means, as a spring, acting to normally press the lever-lock into position to engage the lever, and means for operating the lever-lock to release the lever actuated by the escape of a carrier from the sending apparatus.

8. In a pneumatic-despatch-tube system the combination with a transit-tube of a sending apparatus whereby a carrier can be injected into the transit-tube, a motor for actuating said sending apparatus, a power-controlling device for regulating the operation of said motor, an actuating-lever having a resilient connection with said controlling device and a lock to secure it in position to actuate said controlling device, means as one or more locks for temporarily preventing the motor-controlling device from moving under the resilient pressure of the lever, means, as a spring, acting to normally press the lever-lock into position to engage the lever, and means for operating the lever-lock to release the lever actuated by the escape of a carrier from the sending apparatus.

9. In a pneumatic-despatch-tube system the combination with a transit-tube of a sending apparatus whereby a carrier can be injected into the transit-tube, a motor for actuating said sending apparatus, a power-controlling device for regulating the operation of said motor, an actuating-lever having a resilient connection with said controlling device and a lock to secure it in position to actuate said controlling device, means as one or more locks for temporarily preventing the motor-controlling device from moving under the resilient pressure of the lever, means, as a spring, acting to normally press the lever-lock into position to engage the lever, a pneumatic cylinder and piston arranged to disengage said lock from the lever, a conduit for motive fluid leading to said cylinder, a valve or valves in said conduit regulating the passage of fluid therethrough and a trip arranged to be operated by the exit of the carrier from the sending apparatus and to open said valve or valves to admit motive fluid to the lock-cylinder.

10. In a pneumatic-despatch-tube system the combination with a transit-tube of a sending apparatus whereby a carrier can be injected into the transit-tube, a motor for actuating said sending apparatus, a power-controlling device for regulating the operation of said motor, an actuating-lever having a resilient connection with said controlling device and a lock to secure it in position to actuate said controlling device, means as one or more locks for temporarily preventing the motor-controlling device from moving under the resilient pressure of the lever, means, as a spring, acting to normally press the lever-lock into position to engage the lever, a pneumatic cylinder and piston arranged to disengage said lock from the lever, a conduit for motive fluid leading to said cylinder, a valve or valves in said conduit regulating the passage of fluid therethrough, a trip arranged to be operated by the exit of a carrier from the sending apparatus and to open said valve or valves to admit motive fluid to the lock-cylinder, and mechanism for closing said valve actuated by the motion of the lever-lock or attached device.

11. In combination with a pneumatic-despatch tube, a sending apparatus whereby a carrier is injected into said tube, a lever for actuating said apparatus, a lever-lock for latching said lever in operative position, a pneumatic cylinder as J having a supply-conduit as P and an exhaust-conduit as N leading therefrom, a piston working in said cylinder arranged to move the lever-lock to release the lever and thereafter to open the exhaust-port of the cylinder, a valve in the supply-conduit, means actuated by the passage of a carrier from the sending apparatus arranged to open said valve and admit fluid to cylinder J and means actuated by fluid exhausting from said cylinder arranged to effect the closing of said valve.

12. In combination with a pneumatic-despatch tube, a sending apparatus whereby a carrier is injected into said tube, a lever for actuating said apparatus, a lever-lock for latching said lever in operative position, a pneumatic cylinder as J having a supply-conduit as P and an exhaust-conduit as N leading therefrom, a piston working in said cylinder arranged to move the lever-lock to release the lever and thereafter to open the exhaust-port of the cylinder, a valve-casing O in the supply-conduit, a valve as $R'$ $R^2$ situated in said casing arranged when closed to cut off the supply of motive fluid and to open the pipe P to the atmosphere, a valve-actuating rod $L^5$ $L^6$, elastic means tending to hold said rod in position to actuate valve $R'$ $R^2$, a cylinder M and piston $M'$ connected to said rod and arranged when actuated to push said rod out of operative position, a finger as $L'$ arranged when actuated by a carrier to withdraw rod $L^5$ $L^6$ from operative position and a connection as specified between conduit N and cylinder M.

13. In a pneumatic-despatch-tube system, a sending apparatus adapted to move into registry with the tube to inject a carrier therein and to move out of registry therewith, to receive a carrier and means situated in the transit-tube close to the sending apparatus and actuated by the escape of the carrier for effecting the return of the sending apparatus to receiving position.

BIRNEY C. BATCHELLER.

Witnesses:
D. STEWART,
EDGAR W. LANK.